United States Patent Office 3,371,070
Patented Feb. 27, 1968

3,371,070
POLYANHYDRIDES OF POLYMERIC FAT ACIDS AS CURING AGENTS FOR EPOXY RESINS
Robert Chang, St. Paul, and Heinz B. Arnold, Minneapolis, Minn., assignors to General Mills, Inc., a corporation of Delaware
No Drawing. Filed Mar. 1, 1965, Ser. No. 436,376
12 Claims. (Cl. 260—78.4)

ABSTRACT OF THE DISCLOSURE

There is disclosed the polyanhydrides of polymeric fat acids and the curing of epoxy resins therewith. With relatively pure dimeric fat acids the anhydride of the dimeric fat acid is obtained. With relatively pure trimeric fat acids the anhydride of the trimeric fat acid is obtained. With mixtures the anhydrides of both forms are obtained. The relatively pure dimer fractions are preferred.

---

This invention relates to the polyanhydride of a polymeric fat acid and in particular to the polyanhydride of polymerized tall oil fatty acids. This invention also relates to the curing of epoxy resins therewith and in particular to the curing of 3,4-epoxy-6-methylcyclohexyl methyl-3,4-epoxy-6-methylcyclohexane carboxylate.

The polymeric fat acids are well known and commercially available. It has been discovered, however, that the polyanhydride thereof has particular utility in the curing of epoxy resins, particularly when employed with conventional anhydride curing agents. It was unexpectedly discovered that replacing a portion of phthalic anhydride with the polyanhydride of a polymeric fat acid in the curing of certain epoxy resins such as 3,4-epoxy-6-methylcyclohexyl methyl - 3,4 - epoxy-6-methylcyclohexane carboxylate (Unox 201), that an unexpected decrease in gel time occurs. With either the use of phthalic anhydride alone or the polyanhydride of the polymeric fat acid alone, the gel times are many times greater than the gel time achieved through use of the mixture.

It is therefore an object of this invention to provide a polyanhydride of a polymeric fat acid.

It is also an object of this invention to provide epoxy resin compositions cured with said polyanhydride.

It is further an object of this invention to provide a process of reducing the gel time in curing 3,4-epoxy-6-methylcyclohexyl methyl - 3,4-epoxy-6-methylcyclohexane carboxylate by using a mixture of phthalic anhydride and the polyanhydride of a polymeric fat acid.

Polymeric fat acids are well known and commercially available materials. These may be prepared from fatty acids as disclosed in U.S. Patent 3,157,681. As disclosed in said patent, the polymeric fat acids may be prepared by the polymerization of fatty acids generally having from 8 to 22 carbon atoms. In addition to the method of polymerization disclosed in said patent, other methods of polymerization are also known and may be employed.

The term "polymeric fat acid" as used herein is intended to be generic to polymerized acids obtained from "fat acids." The term "fat acids" is intended to include saturated, ethylenically unsaturated and acetylenically unsaturated naturally occurring and synthetic monobasic aliphatic acids containing from 8-24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly- and mono-ethylenically unsaturated acids such as 3-octenoic acid, 11-dodecenoic acid, linderic acid, lauroleic acid, myristoleic acid, tsuzuic acid, palmitoleic acid, petroselinic acid, oleic acid, eladic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid and isanic acid.

Because of their ready availability and relative ease of polymerization, oleic and linoleic acids are the preferred starting materials for the preparation of the polymeric fat acids. Mixtures of these acids are found in tall oil fatty acids and, accordingly, tall oil fatty acids are generally employed commercially in the preparation of polymeric fat acids.

The polyanhydride of the polymeric fat acid may be prepared in the conventional manner for preparing anhydrides, such as by treating the polymeric fat acids with an excess of acetic anhydride under reflux, followed by stripping off of excess acetic acid and acetic anhydride at reduced pressure. In addition to acetic anhydride, other anhydride forming agents may be employed, for example, propionic anhydride and butyric anhydride. Heating at the reflux temperature to form the polyanhydride generally requires a time period of ½ to 10 hours, depending on the particular reflux temperature required and the particular anhydride forming reagent. Time periods of about 2-5 hours are commonly employed.

As the polymeric fat acids of commerce are a mixture of predominantly the dimeric form with some trimeric and higher polymeric forms also containing some residual monomeric fat acid, the final product will be a mixture of anhydrides of the various polymeric forms including dimeric, trimeric and higher polymeric forms. Where the starting polymeric fat acids have been distilled to contain relatively high dimeric fat acid contents approaching 100% dimeric fat acids, the final product will contain substantially only the anhydride of the dimeric fat acid. Further, if a relatively pure trimeric fat acid is employed as the starting material, the final product will contain substantially the anhydride of a trimeric fat acid. Typical compositions of commercially available polymeric fat acids obtained from the polymerization of tall oil fatty acids are

| | Percent by wt. |
|---|---|
| $C_{18}$ monobasic acids (monomer) | 5–15 |
| $C_{36}$ dibasic acids (dimer) | 60–80 |
| $C_{54}$ and higher (trimer) polybasic acids | 10–35 |

The relative ratios of monomer, dimer and trimer (or higher) in unfractionated polymeric fat acids are dependent on the nature of the starting material and the conditions of polymerization. For the purposes of this invention, the term "monomeric fat acids" refers to the unpolymerized monomeric acids or derivatives present in the polymeric fat acids; the term "dimeric fat acids" refers to the dimeric acids or derivatives (formed by the dimerization of two fat acid molecules); and the term "trimeric fat acids" refers to the residual higher polymeric forms consisting primarily of trimeric acids or derivatives, but containing some higher polymeric forms.

For the purposes of this invention, the terms "monomeric," "dimeric" and "trimeric" fat acids, are defined further by a micromolecular distillation analytical method. The method is that of Paschke, R. F., et al., J. Am. Oil Chem. Soc. XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue.

Mixtures may be fractionated by suitable means such as high vacuum distillation or solvent extraction technique so as to obtain dimer acid cuts of greater than 80% by weight. It is these dimer-rich fractions which are the preferred starting materials for the polyanhydrides of the present invention.

The preparation of the polyanhydride of a polymeric fat acid can best be illustrated by the following example:

*Example I*

The original starting polymeric fat acid (dimeric fat acid) from polymerized tall oil fatty acids, had the following analysis:

| | |
|---|---|
| Percent monomer (M) | 1.0 |
| Percent dimer (D) | 98.3 |
| Percent trimer (T) | 0.7 |
| Acid value (A.V.) | 193 |
| Saponification value (S.V.) | 199 |

A mixture of 90 grams of this dimeric fat acid and 200 grams of acetic anhydride was heated under reflux for 3.5 hours while nitrogen gas was bubbled through the reaction mixture. The acetic acid formed was removed by evaporation under reduced pressure and the excess acetic anhydride also removed by evaporation at 140° C. under reduced pressure (0.3 mm. Hg) over a 5 hour period. The resulting polyanhydride of the dimeric fat acid had an inherent viscosity of 0.04 (0.5% in m-cresol at 30° C.).

As indicated earlier hereinabove, the polyanhydrides of the present invention are useful for curing epoxy resins. In general, any epoxy resin may be employed, preferably those having an epoxy equivalent weight in the range of 140 to about 1000. The polyanhydrides are particularly useful in the curing of epoxidized polydiolefin compositions. Illustrative thereof are the epoxidized polybutadiene polymers, epoxidized polyisoprene polymers and epoxidized copolymers containing polydiolefins such as the copolymers with styrene. The epoxidized polybutadiene polymers are known and described in U.S. Patent 3,030,366, the disclosure of which is incorporated herein by reference. These are characterized by a substantially linear structure having an epoxy oxygen content of about 7–11% by weight; a molecular weight of about 300 to 3000 and preferably in the range of about 500 to 1800; a viscosity at 25° C. of from 15 to 10,000 poises and preferably in the lower range of 15 to 2000 poises; an iodine value of about 100 to 250 and a percent hydroxyl of about 1.5 to 3%. Such epoxy resins are also available commercially under the trade name "Oxiron."

Another group of epoxy resins are those available commercially under the name "Unox" resins. One of these which particularly illustrates the unexpected utility of the polyanhydrides of this invention is Unox 201, which is 3,4-epoxy-6-methylcyclohexyl methyl-3,4-epoxy-6-methylcyclohexane carboxylate. With this epoxy resin it has been found that with use of a mixture of the polyanhydride of this invention with phthalic anhydride as the curing agent, an unexpected decrease in the gel time occurs over the use of either agent alone. Thus, the polyanhydride of this invention may be employed to reduce the gel time in the system of curing this epoxy resin with phthalic anhydride.

It was further discovered that the use of the polyanhydride of this invention in the curing of the epoxidized polydiolefin resins achieved flexibility without the use of an added flexibilizer. When such resins are cured with anhydrides, such as maleic anhydride, or with a combination of maleic anhydride and an alkylene glycol such as ethylene glycol, such systems cure to a hard, rigid product. If flexibility is desired, an added flexibilizer must be incorporated in the blend.

The curing of the epoxy resins may best be illustrated by means of the following examples.

*Example II*

To 20 grams of an epoxidized polybutadiene resin having an epoxy equivalent weight of 177, a percent epoxy of 9.0, a viscosity at 25° C. of 1800 poises, a percent hydroxyl of 2.5 and an iodine number of 185 (Oxiron 2000), was added 20 grams of the polyanhydride of Example I. The mixture was warmed slightly and the homogenous blend of resins gelled within 10 hours after being heated in a forced draft oven at 90° C. Curing for 2 hours at 90° C., 4 hours at 115° C. and 8 hours at 150° C. produced a tough, flexible specimen which had a Shore D hardness of 21–22. In contrast thereto, a blend of this epoxy resin with maleic anhydride (33:9 by weight) after the same cure cycle, resulted in a brittle, hard solid which had a Barcol hardness of 33–44.

*Example III*

A mixture (A) was prepared from 28 g. of 3,4-epoxy-6 - methylcyclohexyl methyl - 3,4 - epoxy-6-methylcyclohexane carboxylate (Unox 201) 11 g. phthalic anhydride and 2 g. of the polyanhydride of Example I. This mixture was warmed to 100° C. with stirring at which point 0.6 g. ethylene glycol was added. The mixture was then placed in a forced draft oven at 120° C.

A second mixture (B) was prepared from 28 g. Unox 201 epoxy and 13 g. phthalic anhydride. This, too, was warmed to 100° C. with stirring and 0.6 g. ethylene glycol added. The mixture was then heated in a forced draft oven at 120° C.

Comparative gel time, hardness, impact resistance and heat distortion temperature are tabulated below:

| Mixture | Gel Time at 120° C., (min.) | Barcol Hardness | Heat Distortion Temperature, ° C. | Impact Resistance Lbs. |
|---|---|---|---|---|
| A | 80 | 55–60 | 188 | 7.79 |
| B | 165 | 50–58 | 203 | 6.32 |

Barcol hardness was determined on specimens cured for 20 hours at 120° C. The distortion specimens were cured for 4 hours at 120° C., 4 hours at 150° C., and 4 hours at 175° C. Impact resistance was determined on 2" x 2" x ½" cast specimens which were cured following the same schedule used for the heat distortion temperature specimens. The impact resistance represents the weight in pounds of the steel ball causing failure.

If dimer polyanhydride is substituted for the phthalic anhydride, a very flexible product is obtained. Thus, a blend of 14 g. Unox 201, 27 g. dimer polyanhydride and 0.3 g. ethylene glycol gelled in about 350 minutes at 120° C. and after an 8 hour cure at 120° C., had a Shore A hardness of 40–45.

*Example IV*

Employing 14 grams of the epoxy resin of Example III and 27 grams of the polyanhydride of Example I, with 0.3 grams of ethylene glycol, a gel time at 120° C. of 510 minutes resulted. Using the same reactants in a ratio by weight of 20:20:0.3, respectively, provided a gel time at 120° C. of 500–600 minutes.

In the curing of epoxy resins, the polyanhydrides of this invention are employed in an amount of from 100 to 200% by weight based on the epoxy resin. When the polyanhydrides are employed as a substitute for phthalic anhydride in the curing of epoxy resins to provide decreased gel times, they are preferably substituted for about 10–20% by weight of the phthalic anhydrides being employed, thereby decreasing gel time without significantly altering the properties of the cured product.

The embodiments of the invention in which an exclusive property or privilege is claimed are defined as follows:

1. A cured composition of matter, consisting essentially of an epoxy resin having an epoxy equivalent weight of from 140 to about 1000 and a polyanhydride of a polymeric fat acid.
2. A cured composition of matter consisting essentially of an epoxidized polydiolefin resin and a polyanhydride of a polymeric fat acid.
3. A cured composition of matter consisting essentially of epoxidized polybutadiene and the polyanhydride of polymerized tall oil fatty acids.
4. A cured composition of matter consisting of epoxidized polybutadiene and the dianhydride of dimerized tall oil fatty acids.
5. A cured composition of matter consisting essentially of 3,4 - epoxy - 6 - methylcyclohexyl methyl-3,4-epoxy-6-methylcyclohexane carboxylate and a polyanhydride of a polymeric fat acid.
6. A cured composition of matter as defined in claim 5 in which said polyanhydride is the polyanhydride of polymerized tall oil fatty acids.
7. A cured composition of matter consisting essentially of 3,4 - epoxy - 6 - methylcyclohexyl methyl - 3,4 - epoxy-6-methylcyclohexane carboxylate and a mixture of phthalic anhydride and a polyanhydride of a polymeric fat acid.
8. A cured composition of matter consisting essentially of 3,4 - epoxy - 6 - methylcyclohexyl methyl - 3,4 - epoxy - 6 - methylcyclohexane carboxylate and a mixture of phthalic anhydride and a polyanhydride of tall oil fatty acids.
9. A cured composition as defined in claim 8 in which said mixture consists of 80–90% by weight of phthalic anhydride and 10–20% by weight of a polyanhydride of polymerized tall oil fatty acids.
10. A process of reducing the gel time in curing an epoxy resin with phthalic anhydride comprising replacing a portion of said phthalic anhydride employed for curing with a polyanhydride of a polymeric fat acid.
11. A process as defined in claim 10 in which said polyanhydride is the polyanhydride of polymerized tall oil fatty acids.
12. A process as defined in claim 11 in which said polyanhydride of polymerized tall oil fatty acids replaces from 10 to 20% by weight of said phthalic anhydride.

References Cited

UNITED STATES PATENTS 2,450,940 10/1948 Cowan et al.
3,177,175 4/1965 Barry _____ 260—47 X DONALD E. CZAJA, *Primary Examiner.*
C. W. IVY, *Assistant Examiner.*